United States Patent [19]

Smith

[11] Patent Number: 4,629,236
[45] Date of Patent: Dec. 16, 1986

[54] DEVICE FOR SEPARATING COFFEE FILTERS AND SHEATH THEREFOR

[76] Inventor: Richard P. Smith, Box 565, 117 NE First St., Linton, N. Dak. 58552

[21] Appl. No.: 751,958

[22] Filed: Jul. 5, 1985

[51] Int. Cl.$^4$ .......................... B25J 1/00; B65G 59/02
[52] U.S. Cl. ........................................ 294/61; 294/1.1
[58] Field of Search ...................... 294/61, 1.1, 25, 26; 99/295; 29/451; 271/18.1, 18.3

[56] References Cited

U.S. PATENT DOCUMENTS

| 19,328 | 6/1885 | Schimmel | 271/18.3 |
| D. 173,307 | 10/1954 | Hammerstein | D7/50 |
| D. 262,684 | 1/1982 | Daenen | D7/104 |
| 660,993 | 10/1900 | MacLaurin | 271/18.3 |
| 805,664 | 11/1905 | Ramage | 294/25 |
| 1,970,093 | 8/1934 | Homan | 294/61 |
| 3,180,383 | 4/1965 | Nudell | 294/61 |
| 4,141,579 | 2/1979 | Moss | 294/61 |
| 4,285,114 | 8/1981 | Underdahl | 294/1.1 |

Primary Examiner—James B. Marbert
Attorney, Agent, or Firm—Anna P. Fagelson

[57] ABSTRACT

A means for separating one coffee filter from a pack of filters employing a small device having one or more piercing elements. The handle or holder for the piercing elements fits comfortably in the hand. The strength, length, shape and size of the piercing means should be such that the elements penetrate the thickness of one paper filter without causing undue tearing, cutting or destruction of the filters while being able to withstand the lifting pressures exerted when breaking the suction and fiber adhesion of the top filter from the adjoining filter. A sheath for protecting the piercing elements may be in the form of a scoop or measuring receptacle.

8 Claims, 4 Drawing Figures

U.S. Patent    Dec. 16, 1986    4,629,236
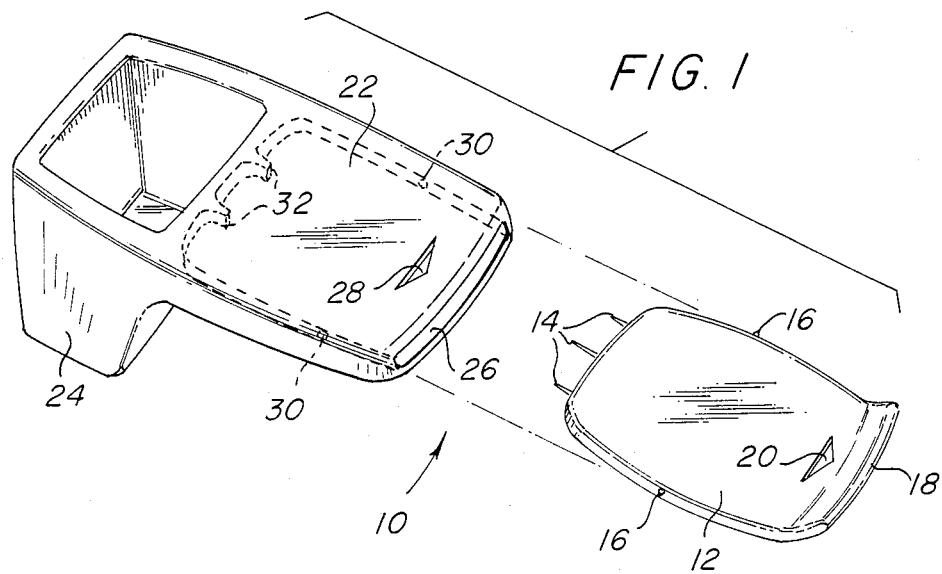
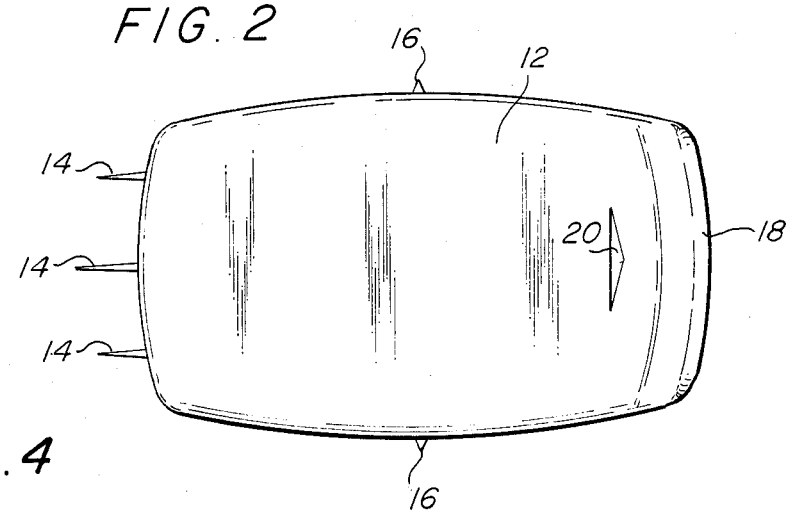
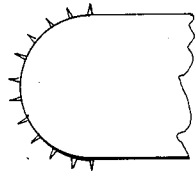
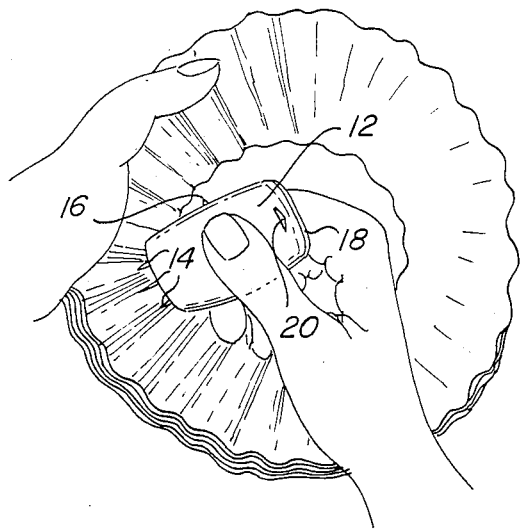

DEVICE FOR SEPARATING COFFEE FILTERS AND SHEATH THEREFOR

BACKGROUND OF THE INVENTION

The invention is directed to a simple and inexpensive means for separating one coffee filter from a pack of filters employing a small hand held device having one or more sharp points.

Coffee filters may be made of various materials that will allow the separation of liquid from solids. However, they are generally made from fibrous products, such as paper, that tend to be tightly held together by suction and fiber adhesion. Thus, it becomes very time consuming and frustrating in order to separate only one filter at a time, particularly for persons in a food service business that prepare large amounts of coffee.

In any business, it is of course important to conserve time and avoid waste. In the food service business, the present practice, without the disclosed invention, requires a time consuming tedious task to pre-separate the filters before rush periods during which there is no time for fumbling around with thin paper filters that are stuck together.

A further object of this invention is to allow the reduction of waste during the coffee filter manufacturing process. Waste can be reduced by allowing more filters to be cut and formed into a pack without concern that the customer may not be able to separate each filter from the others. Also if there is shipping or storage damage to filter packs there will be less waste since the device of this invention will allow separation of even crushed packs. This tool device may also result in the elimination of extra material and costs that may be incurred in buying expensive boxes and plastic containers to protect the filters during transit and storage.

The present invention further provides an improved method to simplify the separation of paper filters by the general public and homemakers. This invention is an even greater assistance tool for persons with short fingernails or poor eyesight, the elderly and others who have difficulty performing detailed tasks.

A further object is to improve sanitary conditions by reducing the possibility of contamination with microorganisms, debris or the like, since there is less hand and finger contact with the filters when employing the device of this invention. This is particularly important in the food service industry where the public is being served.

Various other objects and advantages will hereinafter become more fully apparent from the following descriptions and illustrations of the presently preferred embodiments of this invention.

SUMMARY OF THE INVENTION

The instrument or tool of this invention for separating coffee filters comprises a handle or holder having one or more piercing means embedded, molded, cemented, welded, soldered, brazed or otherwise attached or secured to said carrier body. Further, the piercing means may be manufactured so as to be adjustable or retractable in the holder when not in use or slidable and adjustable by the user so as to be adaptable to engage different types of plain or fluted filters. This small device fits comfortably in the hand and is of sufficient size as to be held easily between the thumb and other fingers.

The device of this invention can easily be manufactured from known materials, such as plastics and metals, by presently available and conventional manufacturing techniques. The handle or holder may be prepared from various materials that should be of sufficient strength to withstand the lifting pressures exerted when breaking the suction and fiber adhesion of the top filter from the adjoining filter. The materials and the selected method of attachment of the piercing means should be sufficiently strong to firmly hold the point or points securely in place during use, and to ensure retaining the proper point angle or such distance separation of the points as may be deemed advantageous when employing a device having more than one point. For successful use, the handle may have various shapes, sizes, surface textures, color and quality. It may be flat and rectangular, square with tapered ends, round, fan-like, curved, etc. Advertisements, slogans, symbols, or the like may be carried on the surface of the handle as well as on the safety cap therefor.

The piercing means comprising a sharp point or pick-like projection may be comprised of various numbers, shapes, sizes and lengths provided it has sufficient surface during lifting without causing undue tearing, cutting or destruction of the filters. In multiple point devices, the points may or may not be uniformly spaced as may be deemed desirable. The strength of the point must be sufficient to hold its sharpness after repeated use and the points and holder strong enough to withstand lifting pressures exerted when breaking the suction and fiber adhesion of the top filter from the adjoining filter.

The length of the piercing element should be at least long enough to fully penetrate the thickness of one paper filter. If, the length of the points are restricted to only protrude 3/64" or less beyond the handle, the tool will function effectively, usually without the sharp points penetrating the skin of the user in the event there is accidental contact therewith. With proper and ordinary use and handling such contact can easily be avoided.

When the pick means is not made retractable into the holder, a safety sheath, case, cap or retractable guard may be employed when said means is not in use. This covering means has been particularly designed to protect the sharp points as well to promote additional product safety for the consumer. The preferred embodiment of a sheath has a scoop or measuring spoon or receptacle on the solid end thereof opposite the opening where the piercing means may be inserted. The scoop or the like may be employed for measuring the coffee to be placed in the filters. It may carry advertisements, logos or the like and be included in coffee cans or containers for promotional or convenience purposes. As with the pick device, the scoop may be manufactured by known means and may be of the same or different materials, color, surface texture or the like. While the size, shape and design of the safety cap depends somewhat on the characteristics of the pick device, the cap may be manufactured in various configurations having various utilities other than that of a scoop. The cap may also merely enclose or cover the disclosed pick device without having any additional function or configurations. The sheath may be made as a guard retractable into the handle and slidable over the points.

BRIEF DESCRIPTION OF THE DRAWINGS

FIG. 1 is a perspective view of the scoop and holder with piercing means, with a top sectional view of the handle of the scoop, which forms the safety sheath for the piercing means, enclosing and protecting the sharp points as well as most of the holder. The length of the piercing means is exaggerated for the convenience of illustration.

FIG. 2 shows the device for separating filters, the length of the piercing means being exaggerated for convenience of illustration.

FIG. 3 depicts a method of using the device for separating coffee filters.

FIG. 4 is a partial exemplification of a device having multiple points, twelve, on the curved end of a handle, the length of the points being exaggerated for convenience of illustration.

DETAILED DESCRIPTION OF THE DRAWINGS AND PREFERRED EMBODIMENTS

In the preferred embodiments shown by the figures, the handle 12 of the tool device has three thin, tapered, sharp, and polished points 14 on one end thereof. The length of the center point protruding from the holder is long enough to fully penetrate the thickness of one paper filter plus enough additional length to allow the adjoining side points to also penetrate the surface of the paper since they may assist the center point with the lifting action, as generally shown in FIG. 3. The side points can provide a dual purpose. Since they also penetrate the surface of the filter, they can act as a brake restricting the depth of penetration of a longer center point during the lifting action. Multiple point devices may, however, be devised where there are several sets, or a number of points on a curved, fan-like, round or other shaped holder. Also, the points may adjustably be engaged to the holder so that the user may set the pins as may be convenient or advantageous for a particular filter.

In the figures, the spacing of the points 14 on the holder 12 may conform generally with the spacing of the flutes of the coffee filters. As generally depicted in FIG. 3, with the proper spacing, when the user penetrates the center of the high crest of a flute with the center point, the side points will also contact the high crest of two additional flutes and thereby increase the lifting capacity of the tool.

To employ an economical, yet very effective instrument easily and to best advantage with a limited number of piercing points, as shown in FIG. 3, the filter pack may be held with one hand between the thumb and fingers, and the tool device may be grasped between the thumb and other fingers of the other hand, while pushing the center point through the high crest of a flute approximately halfway up the inside surface of the top filter. Then with a lifting action of the wrist and hand holding the tool, the top filter will be quickly and easily released from the pack. If the filters are not fluted, then it is only necessary to penetrate the inside surface of the top filter approximately halfway up a side.

While more costly to manufacture, adding a number of points, as for example, twelve, FIG. 4, has been found to improve the performance of the device. Where such multiple pointed device is employed it is particularly advantageous to include the points on a handle or holder having a curved end, for example, of 90°, a 180° semicircle or fan-like, to conform with the curvature of the inside of the filter so that the points, accordingly, while they may be of equal length, are in a curved configuration.

The safety sheath 22 shown in FIG. 1 with a scoop 24 on the solid end thereof may be of any convenient size or shape, usually depending upon the size and design of the holder 12 and piercing means 14. Inside the sheath 22, there may be mounted on the solid end protective stops 32, which will be spaced apart and of such length depending upon the number, spacing and length of the piercing means 14. Also to hold the handle 12 within the sheath 22, on the inner sides of the sheath 22, there may be small stops, such as round projections 30 that are designed to mutually engage projections 16, which may be in the form of vertical lines, on the handle 12. When the pick device is guided 10 into the entrance 26 of sheath 22, projections 16 slide over and past projections 30 in the sheath to form a locking means.

A part of the handle 12 having a hole 20 and an upturned end 18 protrudes from the sheath entrance 26 when inserted therein and aids in the insertion and removal therefrom. Both the handle 12 and sheath 22 may have holes, 20 and 28, respectively, on the end thereof for hanging in the kitchen or near the coffee pot. Holes of a triangular design have been noted to be particularly suitable for hanging on hooks or nails or the like.

While the invention has been particularly shown and described with reference to the preferred embodiments, it will be understood by those skilled in the art that the foregoing are merely illustrative and that changes in form and detail may be made without departing from the spirit and scope of the invention.

I claim:

1. A device comprising an instrument for separating a coffee filter from a pack of filters comprising a flat handle of substantially rectangular shape having one or more thin, tapered, and sharp piercing means secured at one end thereof, and a case or sheath for said handle in the form of a scoop or measuring receptacle, said piercing means being of at least such length, strength, shape and size as to allow penetration of the thickness of one filter at a time with the filter being lifted without undue tearing or cutting when breaking the suction and fiber adhesion of the top filter from the adjoining filter.

2. The instrument of claim 1 wherein there are at least three piercing means.

3. The instrument of claim 2 wherein the piercing means are uniformly spaced apart so that each may align with a high point of a fluted coffee filter.

4. The instrument of claim 2 wherein the piercing means comprises a center thin tapered point and two side thin tapered points, the center point being longer then the side points.

5. The instrument of claim 1 wherein the handle has a curved end engaging multiple piercing means.

6. The instrument of claim 5, wherein the piercing means comprises about twelve points.

7. The instrument of claim 5 wherein the piercing means are uniform in length.

8. The method of separating one coffee filter from a pack of filters comprising grasping the instrument of claim 1 between the thumb and other fingers of one hand and holding a pack of filters in the other hand while pushing the piercing means through the top filter, then with a lifting action of the wrist of the hand holding the instrument separating the top filter from the pack.

* * * * *